Dec. 9, 1941.   A. F. AUSTIN   2,265,468
REMOVABLE TREAD FOR TIRES
Filed Feb. 17, 1941
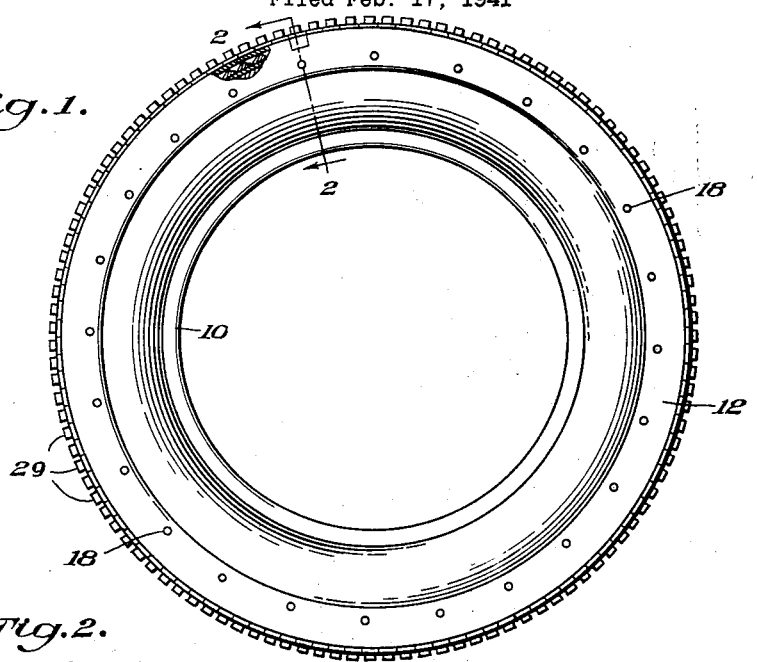
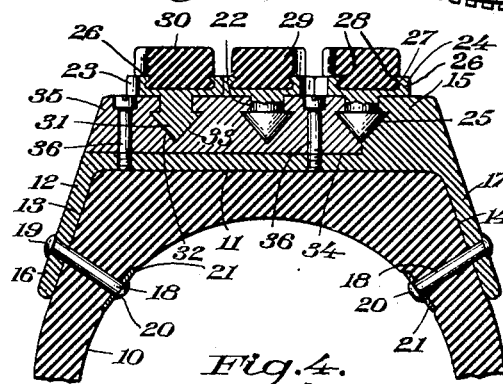
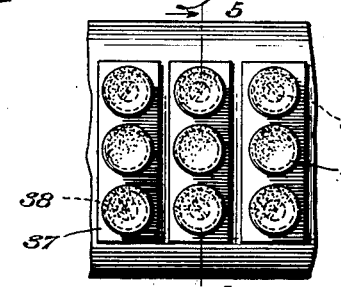
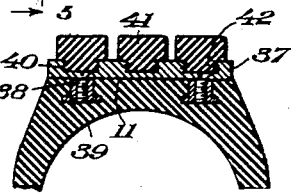
Alfred F. Austin,
INVENTOR
BY Victor J. Evans & Co.
ATTORNEYS Patented Dec. 9, 1941

2,265,468

UNITED STATES PATENT OFFICE 2,265,468

REMOVABLE TREAD FOR TIRES

Alfred F. Austin, Waterbury, Conn.

Application February 17, 1941, Serial No. 379,307

3 Claims. (Cl. 152—56)

My invention relates broadly to vehicle tires and more particularly to a removable tread for the tire.

An important object of my invention is the provision of a tire for a vehicle, which tire is provided with a removable tread whereby the tire may be used until the treads are worn and the treads thereafter removed and replaced by new ones.

Another object of my invention is the provision of a tread of the above-mentioned character that may be readily applied to tires of any size, the tread and its support being formed as a unit and the unit being compact and simple in its construction to promote the inexpensive manufacture thereof.

Other objects and advantages of my invention will be apparent during the course of the following description.

In the drawing, forming a part of this specification, and wherein like numerals are employed to designate like parts throughout the same, Figure 1 is a side elevation of a device embodying my invention and showing the same applied to the tire of an automotive vehicle, Figure 2 is a transverse sectional view taken on the line 2—2 of Figure 1, Figure 3 is a fragmentary top plan view of the same, Figure 4 is a fragmentary top plan view of a modified form of the invention, and Figure 5 is a transverse sectional view taken on the line 5—5 of Figure 4.

In the accompanying drawing, wherein for the purpose of illustration, is shown a preferred embodiment of my invention, the numeral 10 designates the tire of an automotive vehicle, which tire is of conventional shape and construction. The outer peripheral surface 11 of the tire is smooth to provide an essentially flat surface for snugly receiving the annular essentially channel-shaped body 12. The portions 13 and 14 of the side walls of the tire immediately adjacent the periphery thereof are also of essentially flat or smooth formation and are outwardly convergent whereby the inner surface of the intermediate web portion 15 of the body will seat against the peripheral surface 11 of the tire and whereby the inner surfaces of the divergent side flanges 16 and 17 thereof will seat against the mentioned portions 13 and 14 of the side walls. The body is fixedly secured in the above relation with the tire by means of a plurality of circumferentially spaced rivets 18 which extend through the side flanges of the body and through the underlying walls of the tire. The heads 19 and 20, formed at the opposite ends of the rivets, seat against the outer surface of the flange and the inner surface of the tire, respectively, and, if desired, a relatively large washer 21 may be positioned between the inner head 20 and the confronting inner surface of the tire to prevent the head 20 from lacerating the tire. The tire is formed of rubber in the conventional manner and it is obvious that some means must be provided to protect the same from the metallic head of the rivet. In this connection, it is to be understood that the washer 21 merely comprises one means for preventing the head from pulling through the tire and that any means for performing this function is within the contemplation of the invention.

The intermediate web portion 15 of the body is relatively thick and the outer surface thereof is formed with a plurality of laterally spaced circumferentially extending tracks or grooves 22. The grooves are here illustrated as being three in number, the intermediate groove being located at the middle of the web and the grooves at either side thereof being equi-spaced therefrom. A plurality of socket elements 23 are removably mounted in the grooves in the manner best illustrated in Figures 2 and 3.

Each of the socket elements is formed with an enlarged essentially square head 24 having a shank 25 projecting from its bottom face. The head 24 is formed with an upstanding peripheral flange 26 and the free edge of the flange is turned inwardly, as at 27, to enter the peripheral groove 28 in the side wall of the tread member 29 seated therein. The tread members are preferably formed of rubber or the like and the top surfaces 30 thereof project substantially outwardly of the socket heads and extend in essentially coplanar relation with each other. From the foregoing, it will readily be seen that the inturned portions of the socket flanges will fixedly associate the tread members with the sockets and efficaciously prevent the treads from becoming inadvertently disengaged from their respective sockets.

I have here illustrated the shanks 25 as being circular in cross section, the diameter of the shank being substantially equal to the width of the groove whereby the shank may extend into the groove to securely hold the bottom surfaces of the head portions 24 against the outer surface of the body member. The shanks do not, however, fit so snugly as to prevent the shanks from being readily shifted within the grooves. The distal end of each of the shanks is formed with an enlarged conical shaped tip 31, the base of which projects radially from the shank and extends into the undercut inner portions of the side walls of the grooves. As best illustrated in Figure 2, the undercut portion of each groove is formed with inwardly convergent bottom walls 32 and 33 which engage the peripheral surface of the cone-shaped tip 31 to prevent the same from having an independent lateral or rocking movement within the grooves.

In order that the socket elements 23 may be introduced into the respective grooves, I have provided a transverse groove 34 which extends through each of the circumferential grooves 22 and through one edge of the web 15. The transverse groove is essentially deeper than the grooves 22 and is adapted to receive the metallic bar 35 which is removably held therein by means of the bolts 36.

It may thus be seen that if the bar 35 is removed, the sockets 23 together with their respective tread members 29 may be introduced through the transverse groove and inserted in the grooves 22. As best illustrated in Figure 3, a plurality of the sockets are placed within each of the grooves and the rectilinear sides of the head portions thereof are arranged in abutting relation with each other in a manner whereby they will mutually cooperate to prevent the sockets from shifting within the grooves after a sufficient number of the sockets have been introduced into the grooves to provide a continuous column of the sockets around the entire periphery of the body. The opposite sides of the head portions of the intermediate column of sockets abuttingly engage the head portions of the column of sockets at either side thereof. Obviously, each of the sockets will be supported and reenforced by the other sockets contacting therewith whereby to hold the same compactly and normally fixedly associated with the body.

The top surface of the bar 35 is also provided with a plurality of transverse grooves which register with the grooves 22 in the body when the bar is properly positioned within the transverse groove 34. A socket element 23 is placed within each of these last-mentioned grooves and when the bar is fitted into the transverse groove of the body, the head portions of the sockets carried thereby will abuttingly engage the sides of the adjacent sockets in the grooves 22.

It may thus be seen that the laterally spaced columns of sockets extend circumferentially around the body and that shifting of the same within the grooves of the body will be prevented by their mutually pressed relation with each other. The tread members 29 extending from the sockets will provide a non-skid surface for the tire and as soon as the tread members become sufficiently worn, the bar 35 may be removed from the groove 34 and all of the sockets removed from their respective grooves through the said transverse groove. After all the sockets have been removed, they may be replaced by new sockets and the tread of the tire will have been retored.

In Figures 4 and 5, I have illustrated a modification of the above arrangement. In this form of the invention, the body 12 is in the form of a strap 37, which extends transversely of the peripheral face 11 of the tire. The length of the straps is equal to the width of the surface 11 and a plurality of the straps are mounted on the said surface in circumferentially spaced relation about the tire. I prefer that the straps 37 be normally fixedly but removably connected to the tire by means of the screws 38 which screw-threadedly engage within the bushings 39 embedded in the tire. The heads of the screws are received within screw-threaded sockets 40 provided in each of the straps, and the tread members 41 are formed with screw-threaded shanks 42 which threadedly engage within the sockets. As best illustrated in Figure 5, the tread members project substantially beyond the straps and, when the same become sufficiently worn, they may be replaced by new ones.

In each form of the invention the tread members are normally fixedly associated with the tire and it will be readily apparent that it will be the work of but a moment to effect removal of the same and to provide new ones in their place. The arrangement will materially prolong the life of the tire and will prevent the peripheral wall of the tire from becoming progressively thinner and weaker as the tire becomes worn.

It is to be understood that the form of my invention herewith shown and described is to be taken as a preferred example of the same, and that various changes in the size, shape and arrangement of parts may be resorted to without departing from the spirit of my invention, or scope of the appended claims.

Having thus described my invention, I claim:

1. In combination with a vehicle tire, an annular body member adapted to be fixedly applied to the periphery of the tire, said body member being provided with a plurality of laterally spaced circumferentially extending grooves and the side walls of each of the grooves being undercut, socket elements mounted in the grooves and having lateral projections extending into the undercut portions of the grooves to securely hold the sockets associated with the body but permitting the sockets to be freely slidable within the grooves, and tread members carried by the said sockets.

2. In combination with a vehicle tire, an annular body member adapted to be fixedly applied to the periphery of the tire, said body member being provided with a plurality of laterally spaced circumferentially extending grooves and a transverse groove leading from the said first grooves through at least one side of the body, socket elements mounted in the grooves, said sockets having enlarged head portions arranged in abutting relation with each other and shanks extending into the grooves, which shanks being provided with lateral projections extending into the undercut portions in the side walls of the grooves whereby the sockets are normally securely held within the grooves but whereby they may be slidably shifted within the grooves and removed from the body through the said transverse groove, and tread members mounted in the head portions of the said sockets.

3. In combination with a vehicle tire, an annular body member adapted to be fixedly applied to the periphery of the tire, said body member being provided with a plurality of laterally spaced circumferentially extending grooves and a transverse groove leading from the said first grooves through at least one side of the body, socket elements mounted in the grooves, said sockets having enlarged head portions arranged in abutting relation with each other and shanks extending into the grooves, which shanks being provided with lateral projections extending into undercut portions in the side walls of the grooves whereby the sockets are normally securely held within the grooves but whereby they may be slidably shifted within the grooves and removed from the body through the said transverse groove, means detachably mounted in the transverse groove of the body for holding the sockets against displacement, and tread members mounted in the head portions of the said sockets.

ALFRED F. AUSTIN